(12) United States Patent
Liu

(10) Patent No.: US 6,239,239 B1
(45) Date of Patent: May 29, 2001

(54) QUINOLINOXY AND PYRIDINOXY SINGLE-SITE CATALYSTS CONTAINING BENZYL LIGANDS

(75) Inventor: Jia-Chu Liu, Mason, OH (US)

(73) Assignee: Equistar Chemicals, L.P., Houston, TX (US)

( * ) Notice: Subject to any disclaimer, the term of this patent is extended or adjusted under 35 U.S.C. 154(b) by 0 days.

(21) Appl. No.: 09/506,023

(22) Filed: Feb. 17, 2000

(51) Int. Cl.$^7$ .................................................. C08F 4/42
(52) U.S. Cl. ................... 526/161; 526/172; 526/348; 502/102; 502/103; 502/150; 502/123; 502/125
(58) Field of Search .................... 502/102, 103, 502/150, 123, 125; 526/161, 172, 348

(56) References Cited

U.S. PATENT DOCUMENTS

| | | | |
|---|---|---|---|
| 5,064,802 | 11/1991 | Stevens et al. | 502/155 |
| 5,539,124 | 7/1996 | Etherton et al. | 548/402 |
| 5,554,775 | 9/1996 | Krishnamurti et al. | 556/7 |
| 5,599,761 | 2/1997 | Turner | 502/152 |
| 5,637,660 * | 6/1997 | Nagy et al. | 526/160 |
| 5,756,611 | 5/1998 | Etherton et al. | 526/127 |
| 5,852,146 * | 12/1998 | Reichle et al. | 526/172 |
| 5,902,866 | 5/1999 | Nagy et al. | 526/133 |
| 6,020,493 * | 12/1998 | Liu | 546/7 |

\* cited by examiner

Primary Examiner—David W. Wu
Assistant Examiner—Ling-Siu Choi
(74) Attorney, Agent, or Firm—Jonathan L. Schuchardt

(57) ABSTRACT

An improved catalyst for polymerizing olefins is disclosed. The catalyst comprises a Group 4 transition metal, at least one quinolinoxy or pyridinoxy ligand, and at least one benzyl ligand. Particularly when used with an activator, the benzyl-containing catalysts have exceptional activities for polymerizing olefins.

12 Claims, No Drawings

QUINOLINOXY AND PYRIDINOXY SINGLE-SITE CATALYSTS CONTAINING BENZYL LIGANDS

FIELD OF THE INVENTION

The invention relates to the single-site catalysts useful for olefin polymerizations. In particular, the invention relates to improved catalysts that contain a Group 4 transition metal, at least one quinolinoxy or pyridinoxy ligand, and at least one benzyl ligand.

BACKGROUND OF THE INVENTION

Interest in metallocene and non-metallocene single-site catalysts (hereinafter all referred to as single-site catalysts) continues to grow rapidly in the polyolefin industry. These catalysts are more reactive than Ziegler-Natta catalysts, and they produce polymers with improved physical properties. The improved properties include narrow molecular weight distribution, reduced low molecular weight extractables, enhanced incorporation of α-olefin comonomers, lower polymer density, controlled content and distribution of long-chain branching, and modified melt rheology and relaxation characteristics.

Recent attention has focused on developing improved single-site catalysts in which a cyclopentadienyl ring ligand of the metallocene is replaced by a heteroatomic ring ligand. For example, U.S. Pat. No. 5,554,775 discloses catalysts containing a boraaryl moiety such as boranaphthalene or boraphenanthrene. U.S. Pat. No. 5,539,124 discloses catalysts containing a pyrrolyl ring, i.e., an "azametallocene." In addition, U.S. Pat. No. 5,902,866 discloses azaborolinyl heterometallocenes wherein at least one aromatic ring includes both a boron atom and a nitrogen atom.

U.S. Pat. No. 5,637,660 discloses single-site catalysts that contain a Group 4 transition metal (such as titanium or zirconium) and at least one quinolinyl (or "quinolinoxy") or pyridinyl (or "pyridinoxy") group. In addition to the quinolinoxy or pyridinoxy group, these catalysts contain two "X" ligands, where X is halogen, alkyl, alkoxy, or dialkylamino, and one "L" ligand, where L is X, cyclopentadienyl, substituted cyclopentadienyl, indenyl, or fluorenyl. (Benzyl is not taught as an X or L ligand.) When combined with an activator such as MAO or an ionic borate, these catalysts efficiently polymerize olefins such as ethylene or mixtures of ethylene and α-olefins. The ready availability of quinolinols and pyridinols and ease of preparation make these catalysts an attractive alternative to other heterometallocenes.

Copending appl. Ser. No. 08/872,659, filed Jun. 10, 1997 as a continuation-in-part of the '660 patent, discloses single-site catalysts that contain a Group 3–10 transition or lanthanide metal and at least one quinolinyl or pyridinyl group. In addition to the quinolinyl or pyridinyl groups, these catalysts include an optional polymerization-stable ligand (such as a cyclopentadienyl group), and at least one "X" ligand, where X can be "halogen, $C_1$ to $C_6$ alkyl, $C_6$ to $C_{14}$ aryl, $C_7$ to $C_{20}$ alkaryl, $C_7$ to $C_{20}$ aralkyl, $C_1$ to $C_6$ alkoxy, or —$NR_2$." All of the examples in the '659 application show catalysts that contain one or two quinolinoxy or pyridinoxy groups and two or three chlorides (as "X"). The application gives a skilled person no reason to expect that any one X group (other than, perhaps, chloride) will give a significantly better catalyst than the other listed X groups. For example, a skilled person has no reason to believe that any one ligand within "$C_6$ to $C_{14}$ aryl, $C_7$ to $C_{20}$ alkaryl, $C_7$ to $C_{20}$ aralkyl" will give a significantly better catalyst than the rest.

On the other hand, it would be valuable to identify particular quinolinoxy and pyridinoxy-substituted single-site catalysts with exceptionally high activities. Ideally the catalysts could be prepared inexpensively and in short order, and they would give high yields of olefin polymers.

SUMMARY OF THE INVENTION

The invention is an olefin polymerization catalyst. The catalyst comprises a Group 4 transition metal, at least one quinolinoxy or pyridinoxy ligand, and at least one benzyl ligand. The invention includes a catalyst system comprising the catalyst and an effective amount of an activator.

I surprisingly found that catalyst systems based on quinolinoxy and pyridinoxy complexes of Group 4 transition metals that contain at least one benzyl ligand have exceptional activities for polymerizing olefins. Compared with similar catalysts that contain other $C_6$–$C_8$ aryl, alkaryl, or aralkyl groups, the benzyl group-containing single-site catalysts are far more active.

DETAILED DESCRIPTION OF THE INVENTION

Catalysts of the invention include a Group 4 transition metal, i.e., titanium, zirconium, or hafnium. Preferably, the Group 4 metal is titanium or zirconium. The catalysts also include from one to three benzyl (—$CH_2Ph$) ligands. Preferred catalysts contain three benzyl groups.

The catalysts also include at least one quinolinoxy or pyridinoxy ligand. Preferred catalysts contain only one quinolinoxy or pyridinoxy group. Preferably, the oxygen on the quinolinoxy or pyridinoxy ligand is attached to a carbon that is one or two atoms away from the nitrogen of the quinolinyl or pyridinyl ring. For example, the ligand is preferably an 8-quinolinoxy, 2-quinolinoxy, or 2-pyridinoxy group.

In addition to the benzyl and pyridinoxy or quinolinoxy ligands, the catalysts can include up to 2 additional ligands, which may be labile or polymerization-stable. "Labile" ligands have the ability to dissociate from the metal, particularly during an olefin polymerization, often leaving behind a cationically active species. Suitable labile ligands include, for example halide, dialkylamino, alkoxy, hydrocarbyl, siloxy, hydrido, and the like. "Polymerization-stable" ligands normally stay bonded to the metal during olefin polymerization. Suitable polymerization-stable ligands include, for example cyclopentadienyl and substituted cyclopentadienyl, indenyl, fluorenyl, azaborolinyl, borabenzyl, pyrrolyl, indolyl, and the like.

Catalysts of the invention can be prepared by numerous methods that are generally known to those skilled in the art. The starting material is any convenient source of the Group 4 transition metal. The required ligands can be introduced in any desired order. For example, the quinolinoxy or pyridinoxy ligand or ligands can be introduced either before or after the benzyl ligand or ligands.

Suitable Group 4 transition metal sources include, for example, halides, alkyls, alkoxides, acetates, amides, or the like. Because of their ready availability, halides are particularly preferred. Examples of suitable Group 4 transition metal sources: titanium tetrachloride, titanium tetrabromide, zirconium tetrachloride, zirconium tetrabromide, tetrakis (dimethylamino) hafnium, zirconium tetraacetate, zirconium dichloride diacetate, titanium dimethyl dichloride, and the like.

In one convenient method, a Group 4 transition metal tetrahalide is first reacted with one equivalent of a quinolinol or pyridinol in a hydrocarbon solvent as described in U.S.

Pat. No. 6,020,493, the teachings of which are incorporated herein by reference. Thus, for example, the quinolinol or pyridinol is dissolved or suspended in the hydrocarbon at or slightly above room temperature and is stirred under an inert atmosphere such as nitrogen or argon. The Group 4 transition metal tetrahalide is then preferably added, usually as a solution or suspension in more of the hydrocarbon. After stirring the reaction mixture awhile, preferably at room temperature, solvents are removed, and the residual product is recovered, washed, and recrystallized if desired from a suitable solvent. Example 1 below illustrates this method of preparing the trihalide.

The reaction product is then conveniently combined with from 1 to 3 equivalents of an alkali metal benzyl compound (e.g., benzyl lithium) or a benzyl Grignard reagent (e.g., benzylmagnesium chloride) to replace from 1 to 3 of the remaining halides with benzyl ligands. For example, reaction of titanium tetrachloride with one equivalent of 8-quinolinol, followed by reaction of the product with 3 equivalents of benzylmagnesium chloride, gives 8-quinolinoxytitanium tribenzyl (see Example 2 below). The reaction product can be used without further purification as an olefin polymerization catalyst.

Suitable quinolinols and pyridinols have a nitrogen-containing, six-membered aromatic ring (a pyridine ring) and a hydroxyl group attached to the pyridine ring (as in 2-pyridinol) or to an aromatic ring that is fused to the pyridine ring (as in 8-quinolinol). Either ring can have one or more substituent groups, including halogens, nitro groups, alkyls, aryls, or the like. Suitable pyridinols include, for example, 2-pyridinol, 3-pyridinol, 4-pyridinol, 5-chloro-2-pyridinol, 5-methyl-2-pyridinol, 4-nitro-2-pyridinol, and the like. 2-Pyridinol is particularly preferred. Suitable quinolinols include, for example, 8-quinolinol, 7-quinolinol, 6-quinolinol, 5-quinolinol, 4-quinolinol, 3-quinolinol, 2-quinolinol, 5-methyl-8-quinolinol, 4-nitro-8-quinolinol, 2,7-dichloro-8-quinolinol, and the like. 8-Quinolinol is particularly preferred.

Examples of catalysts of the invention: 8-quinolinoxytitanium tribenzyl, bis(8-quinolinoxy) titanium dibenzyl, tris(8-quinolinoxy)titanium benzyl, 2-pyridinoxytitanium tribenzyl, 8-quinolinoxyzirconium tribenzyl, bis(2-pyridinoxy)hafnium dibenzyl, 4-pyridinoxytitanium tribenzyl, and the like.

The invention includes a catalyst system which comprises the benzyl group-containing Group 4 transition metal catalyst and an activator. Generally, the activator converts the complex to a cationically active species. When an activator is used, it is normally present in an amount within the range of about 0.01 to about 10,000 moles per mole of Group 4 transition metal.

Suitable activators are well known in the art. Examples include alumoxanes (methyl alumoxane (MAO), PMAO, ethyl alumoxane, diisobutyl alumoxane), alkylaluminum compounds (triethylaluminum, diethylaluminum chloride, trimethylaluminum), and the like. Alkylaluminum compounds, particularly triethylaluminum (TEAL) and tri-isobutylaluminum (TIBAL) are particularly preferred.

Suitable activators include acid salts that contain non-nucleophilic anions. These compounds generally consist of bulky ligands attached to boron or aluminum. Examples include lithium tetrakis(pentafluorophenyl) borate, lithium tetrakis(pentafluorophenyl) aluminate, anilinium tetrakis (pentafluorophenyl) borate, and the like. Suitable activators also include trialkyl or triarylboron compounds such as tris(pentafluorophenyl)boron, tris(pentabromophenyl) boron, and the like. Other suitable activators are described, for example, in U.S. Pat. Nos. 5,756,611, 5,064,802, and 5,599,761, the teachings of which are incorporated herein by reference.

The catalysts and catalyst systems are especially valuable for polymerizing olefins. Suitable olefins include ethylene, propylene, butenes, pentenes, hexenes, octenes, styrenes, 1,3-butadiene, norbornene, and the like. Preferred olefins are ethylene, propylene, and mixtures thereof with α-olefins such as 1-butene, 1-hexene, and 1-octene.

The catalysts and catalyst systems are optionally used with an inorganic solid or organic polymer support. Suitable supports include silica, alumina, silica-aluminas, magnesia, titania, clays, zeolites, or the like. The supports can be pretreated thermally or chemically to improve catalyst productivity or product properties. The catalysts and/or activators can be deposited on the support in any desired manner. For instance, the catalyst can be dissolved in a solvent, combined with a support, and stripped. Alternatively, an incipient-wetness technique can be used. Moreover, the support can simply be introduced into the reactor separately from the catalyst.

The catalysts can be used in a variety of well-known olefin polymerization processes, including gas, high-pressure liquid, slurry, solution, or suspension-phase techniques, and combinations of these. The pressures used typically range from about 15 psig to about 15,000 psig. Polymerization temperatures range from about −100° C. to about 300° C., more preferably from about 20° C. to about 200° C., and most preferably from about 60° C. to about 150° C.

The following examples merely illustrate the invention. Those skilled in the art will recognize many variations that are within the spirit of the invention and scope of the claims.

EXAMPLE 1

Preparation of 8-Quinolinoxytitanium Trichloride

The reaction is performed under an atmosphere of dry nitrogen. 8-Quinolinol powder (1.45 g, 10.0 mmol) is added to a flask and is stirred at room temperature for 10 min. Heptane (100 mL) is added, and the mixture is stirred at 40° C. for 30 min. The stirring rate is adjusted to prevent solids from depositing on the walls of the flask. Titanium tetrachloride (10 mL of 1.0 M solution in heptane) is added dropwise to the quinolinol, and the reaction mixture is stirred at room temperature for 20 h at a rate effective to prevent solids from depositing on the walls of the flask. The color changes from white to tomato-juice red. The solids are isolated by decanting the liquid portion. Residual solvent is removed from the solids using vacuum and a nitrogen purge for 30 min. The flask containing the red, solid product, 8-quinolinoxytitanium trichloride (3.04 g), is transferred to a dry box. For comparison purposes, a sample of this material is tested in the ethylene polymerization described in Example 6. The results are reported in Table 1 for Example "C1."

EXAMPLE 2

Preparation of 8-Quinolinoxytitanium Tribenzyl

8-Quinolinoxytitanium trichloride (0.060 g, 0.2 mmol, prepared as described in Example 1) is stirred with toluene (10 mL) for 15 min. at room temperature under nitrogen. Benzylmagnesium chloride (0.60 mL of 1.0 M solution in diethyl ether, 0.60 mmol) is added, and the mixture is stirred for 1 h. The resulting purple solution of 8-quinolinoxy titanium tribenzyl (10 mL, 0.2 mmol) is used to polymerize ethylene as described below in Example 6.

COMPARATIVE EXAMPLE 3

Preparation of 8-Quinolinoxytitanium Tri(o-tolyl)

The procedure of Example 2 is followed, except that o-tolylmagnesium chloride (0.60 mL of 1.0 M solution in diethyl ether, 0.60 mmol) is used instead of benzylmagnesium chloride. The resulting purple solution is used to polymerize ethylene as described in Example 6.

COMPARATIVE EXAMPLE 4

Preparation of 8-Quinolinoxytitanium Tri (phenethyl)

The procedure of Example 2 is followed, except that phenethylmagnesium chloride (0.60 mL of 1.0 M solution in diethyl ether, 0.60 mmol) is used instead of benzylmagnesium chloride. The resulting purple solution is used to polymerize ethylene as described in Example 6.

COMPARATIVE EXAMPLE 5

Preparation of 8-Quinolinoxytitanium Tri(phenyl)

The procedure of Example 2 is followed, except that phenylmagnesium chloride (0.30 mL of 2.0 M solution in diethyl ether, 0.60 mmol) is used instead of benzylmagnesium chloride. The resulting purple solution is used to polymerize ethylene as described in Example 6.

EXAMPLE 6

Ethylene Polymerization

The catalysts prepared above are used in a standard ethylene polymerization process to evaluate how altering the ligands affects catalyst activity.

All polymerizations are performed at 85° C. in a 2-L slurry reactor using isobutane (1000 mL) as a solvent. The reactor is pre-conditioned by heating it to 120° C. and holding it at that temperature for 20 min. under a nitrogen purge. Ethylene, isobutane, hydrogen, and nitrogen are dried prior to use with 13X molecular sieves. For a typical polymerization, the desired amount of hydrogen (ΔP=280 psi) is added to the reactor by monitoring the pressure drop from a 300 mL steel vessel pressurized with hydrogen. Ethylene is introduced into the reactor on demand using a Brooks mass flow meter set at 550 psi. The concentration of ethylene in isobutane is about 20 mole %. Triethylaluminum (2.0 mL of 1.0M solution in heptane, 2.0 mmol) and the quinolinoxytitanium catalyst (0.020 mmol) are injected into the reactor to initiate the reaction. The reactor is kept at 85° C. throughout the polymerization. The polymerization is terminated by venting the reactor. The resulting polyethylene is collected and dried at 50° C. under vacuum. Table 1 shows the effect of using 8-quinolinoxytitanium catalysts containing chloride and other various $C_6$–$C_8$ aryl or aralkyl groups.

TABLE 1

Effect of Ligand on Activity of 8-Quinolinoxytitanium Complexes

| Ex. # | Ligand | PE yield (g/0.5 h) | Activity (kg PE/mol cat/h) | Relative activity |
|---|---|---|---|---|
| C1 | chloride | 6.0 | 600 | 0.19 |
| 2 | benzyl | 31.0 | 3100 | 1.0 |
| C3 | o-tolyl | 14.4 | 1440 | 0.46 |
| C4 | phenethyl | 13.6 | 1360 | 0.44 |
| C5 | phenyl | 9.5 | 950 | 0.31 |

Catalyst: Q-TiL$_3$ where Q = 8-quinolinoxy and L is the ligand listed above.

As the results in Table 1 demonstrate, the quinolinoxytitanium catalyst based on benzyl ligands has more than double the activity of other similar catalysts based on $C_6$–$C_8$ aryl or aralkyl ligands. This result is unexpected because the related art suggests the equivalence of catalysts containing the ligands in Example 2 and Comparative Examples 3–5.

The preceding examples are meant only as illustrations. The following claims define the invention.

I claim:

1. A catalyst which comprises:
   (a) a Group 4 transition metal;
   (b) at least one quinolinoxy or pyridinoxy ligand; and
   (c) at least one benzyl ligand.

2. The catalyst of claim 1 wherein the Group 4 transition metal is titanium.

3. The catalyst of 1 containing one quinolinoxy or pyridinoxy ligand and three benzyl ligands.

4. The catalyst of claim 1 containing an 8-quinolinoxy or a 2-pyridinoxy ligand.

5. The catalyst of claim 1 comprising 8-quinolinoxytitanium tribenzyl.

6. A catalyst system which comprises an activator and the catalyst of claim 1.

7. The catalyst system of claim 6 wherein the activator is selected from the group consisting of alumoxanes, ionic borates and aluminates, organoboranes, organoaluminum compounds, and mixtures thereof.

8. A supported catalyst of claim 1.

9. A supported catalyst system of claim 6.

10. A process which comprises polymerizing an olefin in the presence of an effective amount of the catalyst of claim 1.

11. A process which comprises polymerizing an olefin in the presence of an effective amount of the catalyst system of claim 6.

12. A catalyst system which comprises an activator and a catalyst selected from the group consisting of 8-quinolinoxytitanium tribenzyl, 8-quinolinoxyzirconium tribenzyl, 2-pyridinoxytitanium tribenzyl, and 2-pyridinoxyzirconium tribenzyl.

* * * * *